United States Patent [19]

Shelander

[11] Patent Number: 4,992,655
[45] Date of Patent: Feb. 12, 1991

[54] SELF-RESONANT GALVANOMETER SCANNING SYSTEM WITH EVACUATED CHAMBER

[75] Inventor: David J. Shelander, St. Paul, Minn.

[73] Assignee: Printware, Inc., St. Paul, Minn.

[21] Appl. No.: 430,867

[22] Filed: Nov. 2, 1989

[51] Int. Cl.$^5$ .................... H01T 3/14; G02B 26/08
[52] U.S. Cl. .................................. 250/235; 350/6.6
[58] Field of Search ............. 250/234, 235, 236, 230; 346/108, 109; 350/6.1–6.9

[56] References Cited

U.S. PATENT DOCUMENTS

| | | | |
|---|---|---|---|
| 4,349,843 | 9/1982 | Laakmann et al. | 350/6.8 |
| 4,367,912 | 1/1983 | Kitamura | 350/6.8 |
| 4,370,019 | 1/1983 | Shiraski | 350/6.6 |
| 4,690,550 | 9/1987 | Kühno | 350/6.6 |
| 4,717,223 | 1/1988 | Ishida et al. | 350/6.8 |
| 4,803,367 | 2/1989 | Murase et al. | 250/236 |
| 4,877,955 | 10/1989 | Ono | 250/235 |

Primary Examiner—David C. Nelms
Assistant Examiner—Michael Messinger
Attorney, Agent, or Firm—Dressler, Goldsmith

[57] ABSTRACT

A very stable deflection system usable with a beam of radiant energy incorporates a self-resonant scanning galvanometer located within an evacuated chamber. The chamber has a hermetic radiant energy transmissive window. An exterior laser source provides a beam of monochromatic light which is directed onto the mirror of the galvanometer. Repetitive deflection of the galvanometer mirror at a predetermined frequency results in the beam being projected onto a target so as to form a very stable and repeatable scanning line. Movement of the target provides a multi-line raster on which an image can be formed.

29 Claims, 4 Drawing Sheets

SELF-RESONANT GALVANOMETER SCANNING SYSTEM WITH EVACUATED CHAMBER

FIELD OF THE INVENTION

The invention pertains to high speed, high resolution and very stable image forming systems. More particularly, the invention pertains to very stable high resolution, high speed laser based printers usable with data processing systems.

BACKGROUND OF THE INVENTION

High speed, high resolution laser based scanning systems have been utilized in non-impact printer products. Such scanning systems offer higher speed and resolution than can be cost effectively achieved using electromechanical printers.

Such systems usually incorporate a modulatable beam of light which can be deflected onto a target by a movable deflection member such as a mirror or prism. Such systems can be operated to create a raster formed of multiple scan lines. Text images can thus be generated on a line-at-a-time basis.

Higher resolution and higher speed require that the beginning and ending points of each the scan lines line up with the corresponding points of the other scan lines of a given raster. Where the light beam deflection mechanism is a self-resonant galvanometer, various systems have been developed for the purpose of improving the alignment of scan lines' starting and ending points.

One such system is disclosed in Schoon U.S. Pat. No. 4,630,223 entitled "Scanner Amplitude Stabilization System". A second system is described in Schoon U.S. Pat. No. 4,686,363 entitled "Self-Resonant Scanner Biasing System" which patent is incorporated herein by reference.

While the known systems provide improvements to scanning repeatability, nevertheless, as scanning speeds increase and resolution requirements increase, a higher degree of scan line stability is desired than has been provided by the previously known systems. Preferably, enhanced scan line stability can be achieved in a cost effective system which does not require complex mechanical modifications to the scanner nor additional complex control circuitry.

SUMMARY OF THE INVENTION

A system for repeatably deflecting a beam of radiant energy onto a target includes a source for generating the beam of energy and a deflection apparatus which has a beam deflecting surface movable in response to an applied electrical signal.

A control circuit is provided for generating and applying the electrical signal to the deflection apparatus. A closed housing has an internal chamber which can be evacuated to an internal pressure less than the ambient pressure. The deflection apparatus is located within the closed housing. The housing also has a radiant energy transmissive window.

The source directs a beam of radiant energy through the energy transmissive window onto the deflecting surface within the reduced pressure region in the housing. The surface moves in response to the applied electrical signal deflecting the beam of radiant energy onto the target.

The movement of the deflecting surface can form a linearly extending locus of incident points of radiant energy on the target thereby forming a scan line. The beginning and ending points of the scan lines, as a result of locating the deflection apparatus within the reduced pressure region, are repeatable with a low variance from the nominal start of trace and end of trace points.

The deflection system can be a self-resonant galvanometer with the deflecting surface the galvanometer scanning mirror. Alternately, the deflection system can be a multi-faceted mirror driven by a constant speed motor. The deflecting apparatus could alternately be formed of a motor driven rotating prism.

A method of very precisely deflecting a beam of radiant energy onto a target includes the steps of forming a relatively low pressure deflecting region; generating a beam of radiant energy; directing the beam along a first path into the deflecting region; moving a deflecting member thereby changing the direction of the beam from the first path to a second path while the beam is in the low pressure deflecting region and then directing the beam along the second path to the target.

The method can also include a step of evacuating the region to a predetermined low pressure below the ambient pressure and maintaining that evacuated pressure while changing the direction of the beam. In addition, the method can include modulating the beam of radiant energy as well as repetitively deflecting the beam to form a multi-scan line raster.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENT

Figure 1:
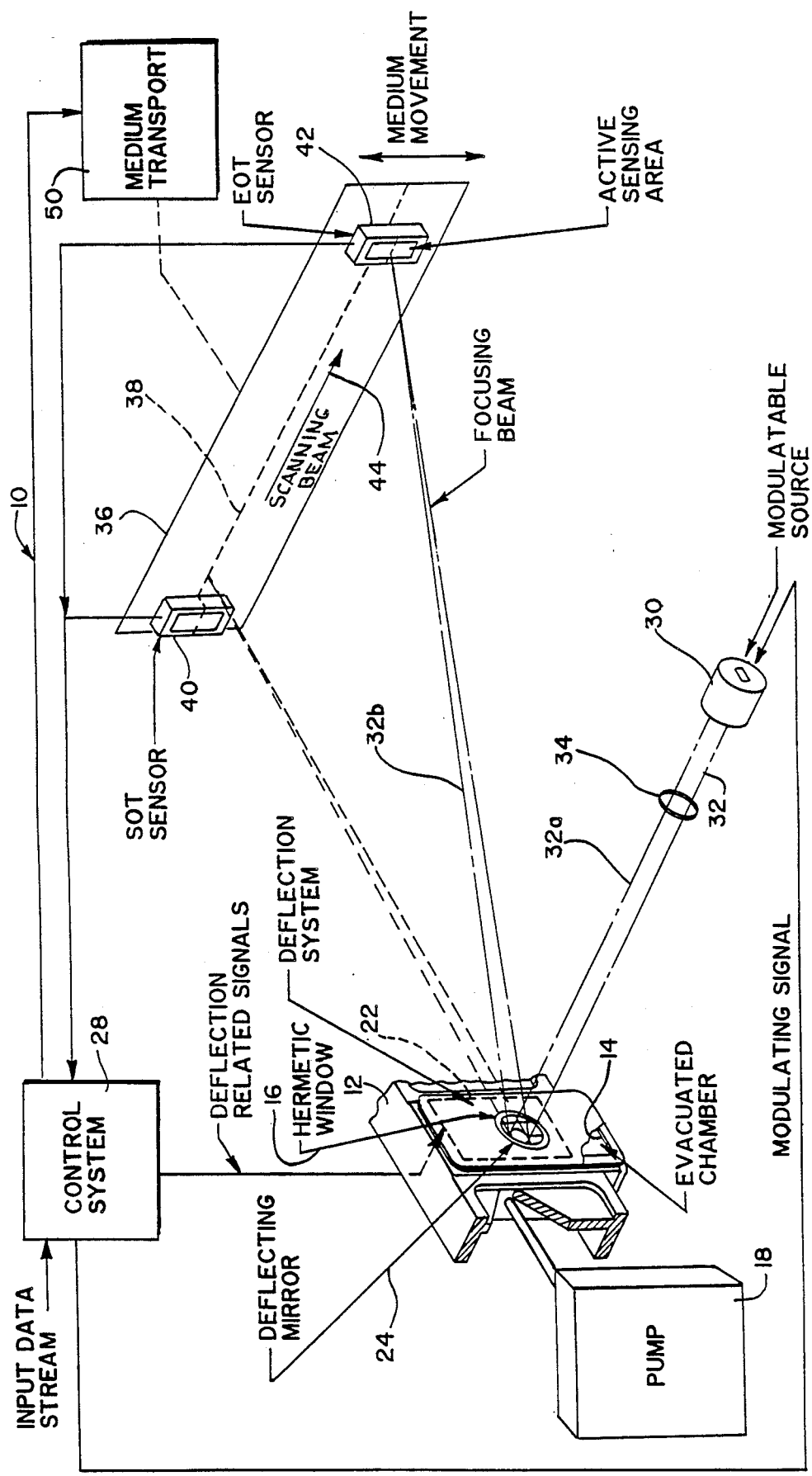
FIG. 1 is an overall block diagram of a system in accordance with the present invention.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

A very precise, highly repeatable scanning deflection system 10 incorporates an evacuatable chamber with a self-resonant galvanometer, and associated scanning mirror, located therein. The deflection system can be used to deflect a beam of modulated, laser generated, light onto a target thereby forming a linear locus of incidence, a scan line, on the target.

The target can be a photosensitive medium. The medium can be either moved linearly or rotated so as to continuously provide a fresh surface on which to deflect the modulated beam forming the next scan line.

A control system can be used to coordinate movement of the deflection mirror, the modulated light beam and movement of the medium. The control system can be implemented as a stored program microcomputer if desired.

With respect to FIG. 1, the system 10 includes an evacuatable housing 12 defining a closed internal chamber 14. An energy transmissive window 16 is located on the housing 12. The region 14 can be evacuated to a predetermined pressure lower than the ambient pressure by using vacuum pump 18.

A deflection system 22, illustrated in phantom, is located in the region 14. A deflection mirror 24 is movably carried on the deflection system 22.

The deflection system 22 is preferably a self-resonant galvanometer. However, it will be understood that the nature of the deflection system is not a limitation of the present invention. Alternately, the deflection system could be multi-faceted mirror rotated by a motor or a prism rotated by a motor.

Coupled to the deflection system 22 is a control system 28. The control system 28, which could be implemented as a stored program microcomputer, is also coupled to a modulatable source 30.

The modulatable source 30 generates a beam of monochromatic radiant energy 32, or light, at a selected frequency. The source 30 could be for example, a continuous laser which generates an output light beam of an appropriate frequency.

Output from the modulatable source 30, the beam of radiant energy 32 can be focused in a lens 34. The beam 32a is then directed so as to be incident on the movable deflection mirror 24 thereby forming a deflected beam 32b which impinges as a dot of a predetermined size upon a medium 36. The control system 28 in combination with the deflection system 22 can then deflect the beam 32b so as to form a scan line 38 on the movable medium 36.

A start of trace sensor 40 and an end of trace sensor 42 are provided adjacent the beginning and the ending region of the linear scanning locus 38. The sensor 40 can be used to detect that the beam 32b is at the beginning of a scan line when scanning in a direction 44. The end of trace scanner 42 can be used to determine when the beam 32b has reached the nominal end of a scan and is beginning another scan in a direction opposite the direction 44.

The medium 36 can be moved under the control of a medium transport 50. Movement can be linear or rotary.

As the deflection system 22 moves the deflecting mirror 24 back and forth in a predetermined arc, scan lines are created on the target 36 first in the direction 44 and opposite the direction 44 and then again in the direction 44 so as to form a multi-line raster on the medium 36. The sensors 40 and 42 provide feedback to the control system 28 as to the beginning and ending locations of the beam during any one scan.

The evacuated chamber 14 results in the system 10 having a very high degree of scan line repeatability such that the start and end points of various scan lines all overlap the sensors 40 and 42 by a constant predetermined amount. This results in images being generated on the medium 36 which can be formed of a higher density of modulated dots per scan line and with a greater degree of alignment between scan lines than heretofore possible.

Figure 2:
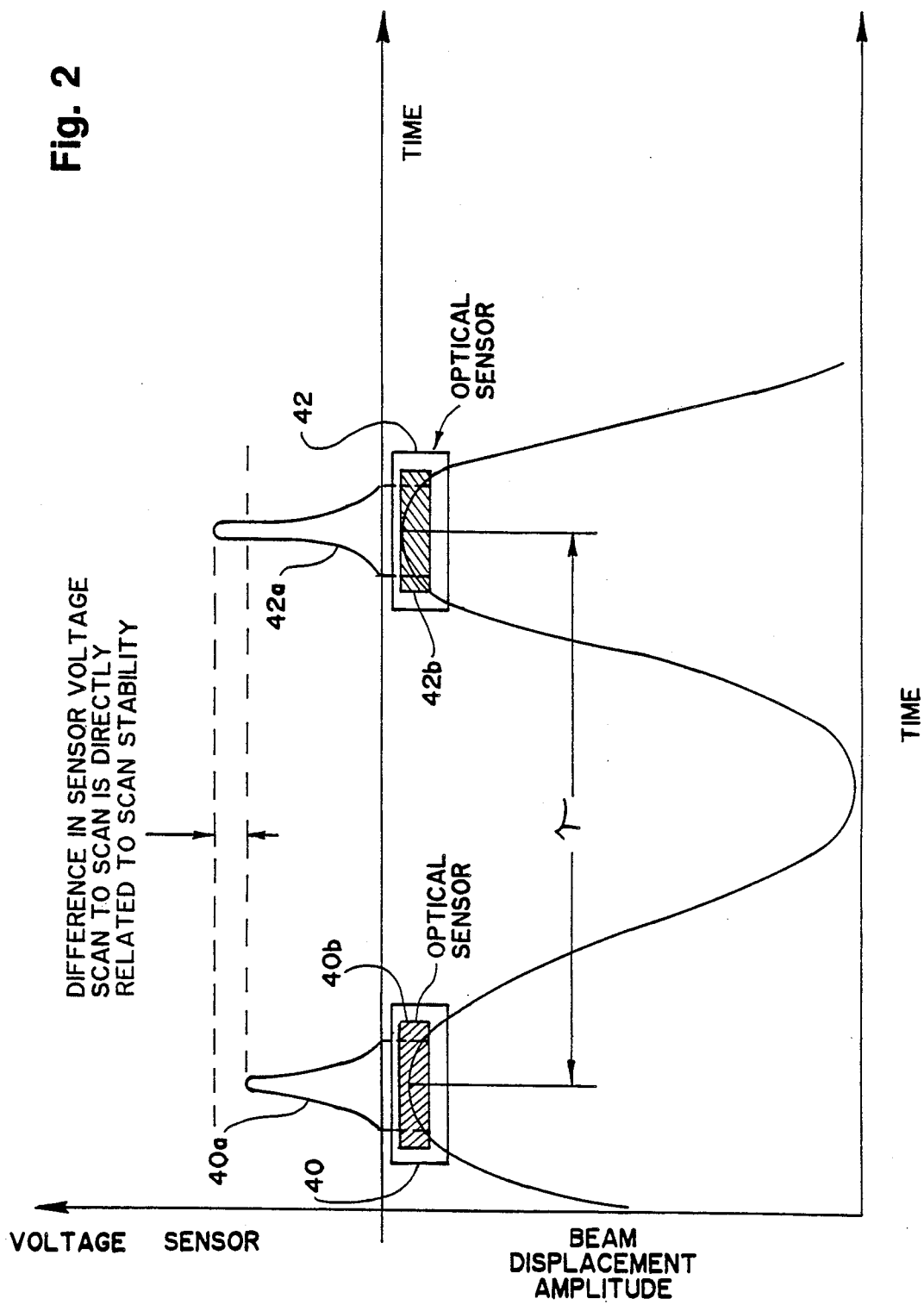
FIG. 2 is a graph illustrating beginning of scan and end of scan sensor output voltage variations as a result of scan line instability.

FIG. 2 illustrates schematically sensors 40 and 42 sensing the beam 32b as the beam is swept from a beginning position on the sensor 40 to an ending position on the sensor 42 by means of the deflection system 22. Output from the sensor 40, a wave form 40a is illustrated on FIG. 2 as is output from a sensor 42, a wave form 42a.

As illustrated in FIG. 2, the beam 32b extends onto sensing regions 40b and 42b in different amounts due to variations in the displacement of the deflection mirror 24. As a result, the amplitudes of the electrical outputs 40a and 42a vary.

The amplitude variations provide an indication of actual beam positions and are illustrative of instability in the deflection of the beam 32b. It is this type of instability that the previously noted patents attempt to compensate for. It is also this type of instability that the system 10, previously described, substantially reduces.

Figure 3:
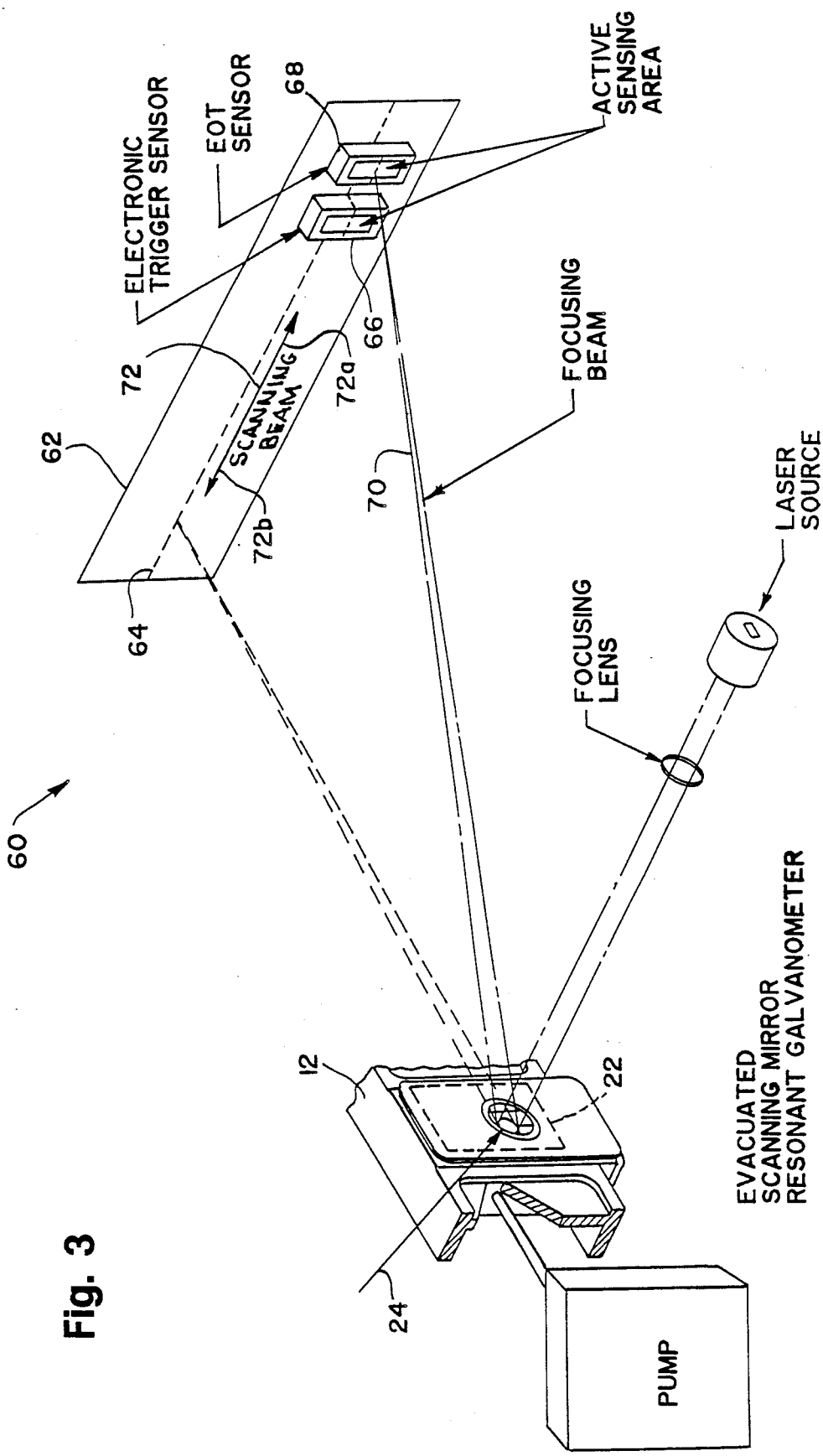
FIG. 3 is an overall block diagram of an experimental apparatus for measuring scan line stability.

As an illustration of the increased stability obtainable with the system 10 over that of an unevacuated system, FIG. 3 illustrates a block diagram of an experimental apparatus 60 usable to measure the improvement in beam stability as a function of vacuum in the chamber 14. The previously described deflection system 22, a self-resonant galvanometer, has been located in the chamber 14 of the housing 12. A target 62 is provided on which an elongated locus of incident points can be formed along a line 64. Two sensors 66 and 68 are provided at one end of the line 64.

The beam 70 can be swept back and forth along the line 64 in the directions 72a and 72b utilizing the scanner 22. Each time the beam 70 is swept in a direction 72a toward the sensors 66 and 68 as it crosses over trigger sensor 66 an oscilloscope or other measuring instrument can be triggered. When the beam 70 crosses over the end of scan or end of trace sensor 68, the deflection system 22 will cause it to retrace in the direction 72b.

The output voltage generated by the end of trace sensor 68 should have a constant value if the beam 70 continuously repeats exactly the same scan line with respect to the medium 62. Variations in the stability of the scan line will be indicated by the variations in the output voltage of the sensor 68 as illustrated in FIG. 2.

Figure 4:
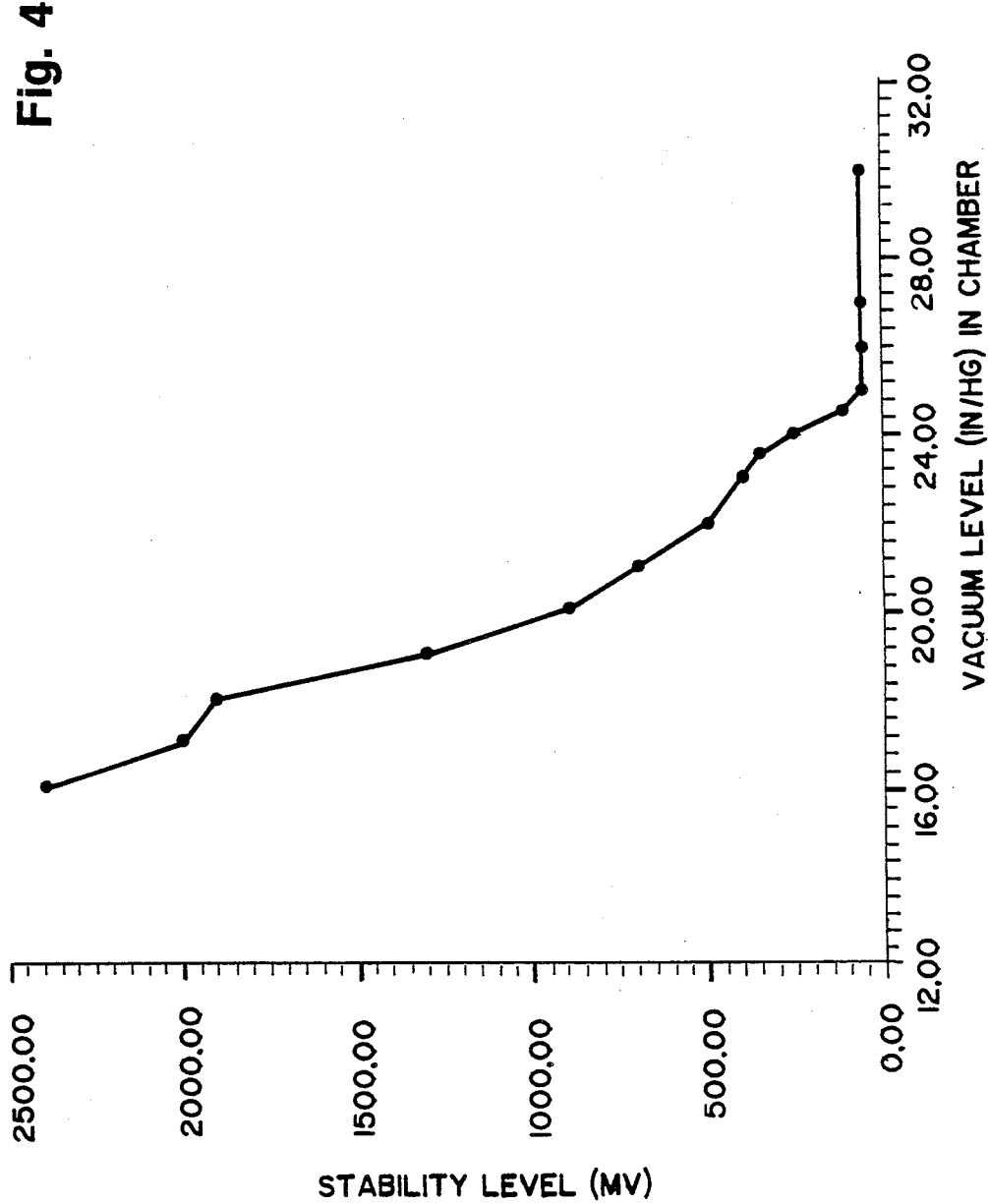
FIG. 4 is a graph illustrating improvement in scan line stability as a function of vacuum level.

FIG. 4 illustrates a substantial increase in scan line stability achieved when the housing 12 is evacuated while the scanner 22 is deflecting the beam 70. The X axis of FIG. 4 indicates increasing vacuum, less pressure, present in the chamber 14 of the housing 12. The Y axis of FIG. 4 indicates variations in output voltage from the sensor 68 as the focusing beam 70 is repetitively swept along the line 64 using the apparatus 60 of FIG. 3.

As illustrated in FIG. 4, when the vacuum level within the chamber 14 has reached about 26 inches of mercury, the variations in output voltage measured by the sensor 68 have declined to about 50 millivolts. On the other hand, when the chamber 14 has been evacuated only to 16 inches of mercury, variations in the output voltage of the sensor 68 are on the order of 2400 millivolts. Hence, placing the deflection system 22 within the evacuable region 14 and evacuating same to about 26 inches of mercury will result in a dramatic decrease in variation of the location of the scan line incident on the medium 36 of FIG. 1 during an imaging operation.

With respect to FIG. 3, the position of the end of trace sensor 68 was adjusted such that the beam 70 just peaked over the edge of the photoconductor mask on the end of each swing of the mirror 24 of the deflection system variations 22. The voltage illustrated in FIG. 4 corresponds to the additional distance that the beam 70 travelled over the edge of the photosensor 68 onto the active, detecting region.

With respect to the apparatus 60, the size of the evacuated chamber 14 was on the order of 2 inches wide by 6 inches long by 2 inches high. The deflector mirror 24 was on the order of 0.65 inches in diameter and it was oscillating at 800 hertz with a constant scan amplitude of plus/minus 11 mechanical degrees. This produced an overall 22° deflection of the beam 70. The total optical path of the apparatus 60 from the laser to the scan line 64 was approximately 46 inches.

The theory of operation of the present invention by which the performance characteristics of a moving mirror resonant galvanometer can be greatly enhanced by the operation of such a device in a strict vacuum is not precisely understood. However, it is hypothesized, without limitation to the invention, that the random nature of the small air turbulence and eddy currents impinging on the mirror surface and moving galvanometer parts can cause amplitude instability leading to random amplitude fluctuations and erratic motion. As the surrounding pressure is reduced the mean free molecular path is increased and the number of molecular impacts on the galvanometer's moving parts decrease leaving a more pure undisturbed motion. This results in an overall increase in scan amplitude stability.

A system in accordance with the present invention can be used not only in non-impact printers or output devices but also in photocopy devices or computer output microfilm devices. The type of application is not a limitation of the present invention.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system usable at an ambient pressure for precisely deflecting a beam of radiant energy comprising:
   a source for generating a beam of radiant energy;
   a deflection apparatus with a beam deflecting surface movable in response to an applied electrical signal;
   a control circuit for generating and applying said electrical signal to said deflection apparatus in order to maintain the deflection amplitude thereof constant to the limits of mechanical and electrical noise; and
   a closed housing defining a chamber evacuated to an internal vacuum level more than 25 inches mercury with at least said beam deflecting surface contained therein;
   the evacuation of the housing's chamber serving to lessen the mechanical noise of the beam deflecting surface of the deflection apparatus.

2. A system as in claim 1 with said housing including a radiant energy transmissive window.

3. A system as in claim 1 with said deflection surface formed as a substantially planar mirror.

4. A system as in claim 1 with said deflection apparatus including a self-resonant galvanometer with an arcuately deflectable mirror.

5. A system as in claim 1 with said control circuit including circuitry for modulating said generating source.

6. A system as in claim 1 with said control circuit including circuitry for deflecting a generated beam off of said surface along a predetermined path.

7. A system as in claim 6 including at least a first deflection sensor coupled to said control circuit for detecting an extent of deflection of said beam.

8. A system as in claim 7 including a second deflection sensor spaced from said first sensor.

9. A system as in claim 8 for deflecting a beam onto a medium for generating images including a medium moving apparatus coupled to said control circuit.

10. A method of precisely deflecting a beam of radiant energy onto a target comprising:
    forming a relatively low pressure deflecting region having a vacuum level greater than 25 inches of mercury;
    generating a beam of radiant energy;
    directing the beam along a first path into the deflecting region;
    oscillating a deflecting member to thereby change the direction of the beam from the first path to sweep at various deflection angles along a second path while the beam is within the low pressure deflecting region; and
    directing the beam along the second path to the target; and
    dynamically controlling the oscillating of the deflecting member so that the deflection angles through which the beam is swept are constant from one oscillation cycle to the next.

11. A method as in claim 10 usable in an environment with an ambient pressure with the forming step including evacuating the region to a predetermined pressure below the ambient pressure and maintaining that evacuated pressure in the deflecting region during at least the changing step.

12. A method as in claim 10 with the generating step including producing a beam of light of essentially a single frequency.

13. A method as in claim 10 with the changing step including providing a beam deflecting member and locating that member in the deflecting region.

14. A method as in claim 13 including providing an electrical signal indicative of a desired deflection and moving the member within the deflecting region in response thereto.

15. A method as in claim 10 with the changing step including moving the beam within the deflecting region so as to form a substantially linear locus of incidence on the target.

16. A method as in claim 10 including modulating the beam simultaneously with changing the direction thereof.

17. A method as in claim 16 including providing a data stream for modulating the beam.

18. A method as in claim 10 including deflecting the beam, while in the low pressure region, along a plurality of paths different from the first path so as to form a selected locus of incidence on the target.

19. A method as in claim 18 including sensing at least a first extent of the locus.

20. An apparatus for very precisely deflecting a radiant energy beam from a source to a target comprising:
    a closed housing defining an evacuatable chamber therein having a vacuum level greater than 25 inches of mercury, said housing having at least one radiant energy transmissive region for ingress and egress of the beam; and an oscillatory beam deflecting mechanism carried within said evacuatable chamber and responsive to a deflection drive signal, for deflecting the beam through said transmissive region to the target at various deflection angles in accordance with the deflection drive signal;

means for sensing the various deflection angles of the deflected beam; and deflection drive signal means, responsive to the sensing means, for producing a deflection drive signal that causes the deflection angles to be equal from oscillation to oscillation of the beam deflecting mechanism.

21. An apparatus as in claim 20 with said mechanism including a self-resonant galvanometer.

22. An apparatus as in claim 20 including a control system coupled to said mechanism.

23. An apparatus as in claim 22 including a source of radiant energy with said control system including circuitry for modulating said source.

24. An apparatus as in claim 22 including a target moving system coupled to said control system.

25. An apparatus as in claim 20 with said mechanism including a multi-element reflecting member and an electrically powered motor coupled thereto.

26. An apparatus as in claim 22 including a medium transport coupled to said control system.

27. An apparatus as in claim 26 including a sensor positioned adjacent the medium for measuring an extent of said deflection.

28. An apparatus as in claim 26 including beam modulation circuitry.

29. An apparatus usable in a selected environment to generate images on a target medium comprising:

a housing defining an internal closed chamber evacuated to a predetermined pressure below an ambient pressure of the environment, said predetermined pressure being a vacuum level greater than 25 inches of mercury;

a modulatable beam of radiant energy;

an oscillating electro-mechanical deflector carried at least in part within said chamber, for controllably deflecting said beam onto a region of the medium;

a control system coupled to said source and said deflector for forming a locus of incident energy on the medium that is of equal regional extent from oscillation to oscillation of the electro-mechanical deflector; and a chamber evacuating pump coupled to said housing.

* * * * *